United States Patent
Biernat et al.

(10) Patent No.: US 12,478,679 B2
(45) Date of Patent: Nov. 25, 2025

(54) PHARMACEUTICAL CARRIER FOR ACTIVE SUBSTANCES AND A PHARMACEUTICAL COMPOSITION CONTAINING SAID CARRIER

(71) Applicant: BIOTTS S A, Wroclaw (PL)

(72) Inventors: Pawel Biernat, Wroclaw (PL); Jan Meler, Smolec (PL)

(73) Assignee: BIOTTS S A, Wroclaw (PL)

( * ) Notice: Subject to any disclaimer, the term of this patent is extended or adjusted under 35 U.S.C. 154(b) by 1133 days.

(21) Appl. No.: 17/420,133

(22) PCT Filed: Jan. 10, 2020

(86) PCT No.: PCT/PL2020/050003
§ 371 (c)(1),
(2) Date: Jun. 30, 2021

(87) PCT Pub. No.: WO2020/145833
PCT Pub. Date: Jul. 16, 2020

(65) Prior Publication Data
US 2022/0062422 A1     Mar. 3, 2022

(30) Foreign Application Priority Data
Jan. 10, 2019    (PL) .......................... 428534

(51) Int. Cl.
| | | |
|---|---|---|
| A61K 47/20 | (2006.01) |
| A61K 9/06 | (2006.01) |
| A61K 36/718 | (2006.01) |
| A61K 36/9066 | (2006.01) |
| A61K 47/18 | (2017.01) |
| A61K 47/22 | (2006.01) |
| A61K 47/44 | (2017.01) |

(52) U.S. Cl.
CPC ............... *A61K 47/20* (2013.01); *A61K 9/06* (2013.01); *A61K 36/718* (2013.01); *A61K 36/9066* (2013.01); *A61K 47/18* (2013.01); *A61K 47/22* (2013.01); *A61K 47/44* (2013.01)

(58) Field of Classification Search
CPC ........ A61K 47/20; A61K 47/18; A61K 47/22; A61K 47/44; A61K 9/06; A61K 36/718; A61K 36/9066; A61K 31/07; A61K 39/39541; A61K 39/39591; A61K 9/0014; A61K 31/375; A61K 31/70; A61K 47/14; C07K 16/2809
See application file for complete search history.

(56) References Cited

U.S. PATENT DOCUMENTS

| | | | | |
|---|---|---|---|---|
| 5,814,659 A | * | 9/1998 | Elden ................. | A61K 31/5375 514/552 |
| 2004/0175415 A1 | * | 9/2004 | Chan .................... | A61K 47/10 424/449 |
| 2005/0112153 A1 | * | 5/2005 | Wagoner ................ | A61P 17/00 424/401 |

FOREIGN PATENT DOCUMENTS

| | | | |
|---|---|---|---|
| JP | H1072312 | * | 3/1998 |
| PL | 286551 A1 | | 2/1991 |
| UA | 94218 U | | 11/2014 |
| WO | 2008/049401 A2 | | 5/2008 |

OTHER PUBLICATIONS

Williams and Barry. Penetration enhancers. Advanced Drug Delivery Reviews. 2012, 64, 128-137.
Sengupta et al. The component fatty acids of chaulmoogra oil. Journal of the Science of Food and Agriculture, 1973, 24(6), 669-674.
International Search Report and Written Opinion, PCT/PL2020/050003, May 7, 2020.

* cited by examiner

*Primary Examiner* — Snigdha Maewall
(74) *Attorney, Agent, or Firm* — Arrigo, Lee, Guttman & Mouta-Bellum LLP

(57) ABSTRACT

The present invention relates to a pharmaceutical carrier for active substances characterized in that it contains a strongly solvating aprotic solvent from the group of sulfoxides, a carbonic acid amide, and a vegetable oil with a high content of unsaturated fatty acids, and a pharmaceutical composition containing the carrier.

10 Claims, 9 Drawing Sheets

Figure 1:
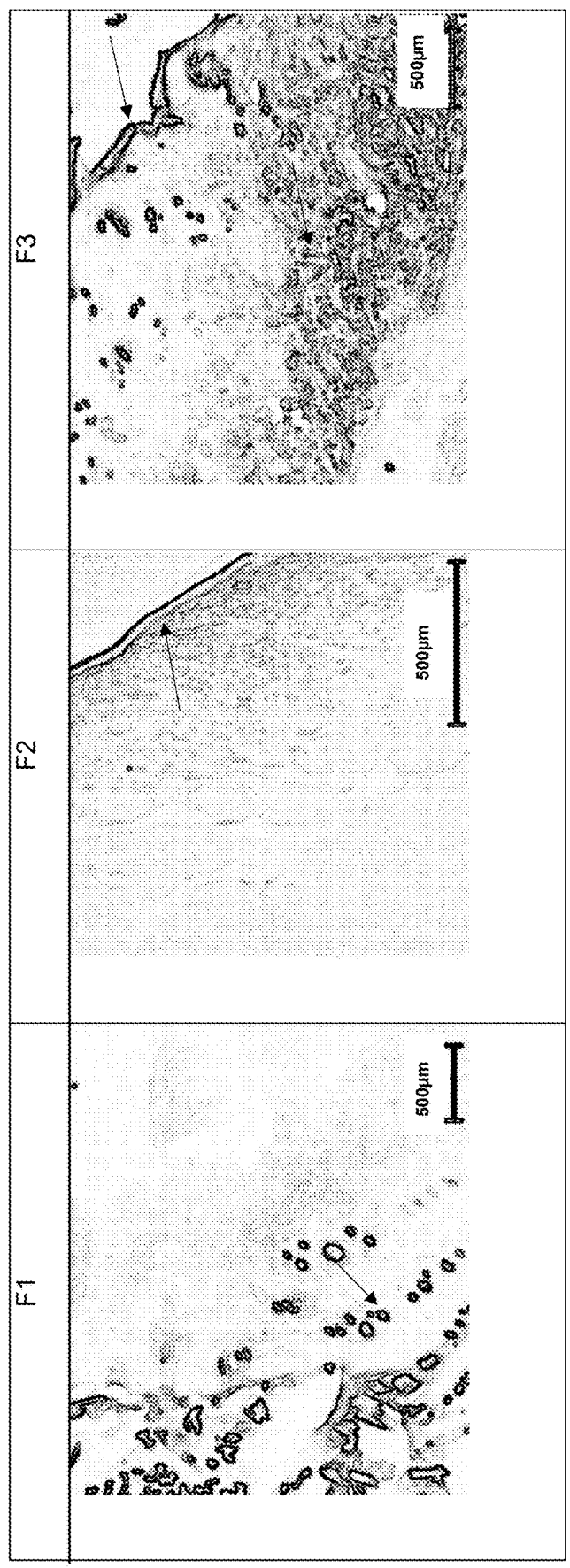

PHARMACEUTICAL CARRIER FOR ACTIVE SUBSTANCES AND A PHARMACEUTICAL COMPOSITION CONTAINING SAID CARRIER

The present invention relates to a semi-solid drug form containing a carrier for active substances. The invention is applicable in pharmacy and medicine.

There are water-soluble active substances known, as well as other fat-soluble ones, which are sometimes to be administered in parallel in some disease states, including inflammation. Inflammation is an ordered process that develops in vascularized tissue under the influence of a damaging factor. Inflammation can be caused by chemical, physical or biological (infection with pathogenic microorganisms) factors—generally exogenous or endogenous factors. Changes in the blood vessels underlie the inflammatory reaction. There is vasodilatation, increased tissue blood supply and vascular permeability, as a result of which various plasma proteins with defense functions, e.g. antibodies or complement, may enter the affected tissue.

Among these active substances is *Curcuma longa* (*Curcuma domestica*). It is a perennial from the ginger family, cultivated in the equatorial zone mainly because of its taste. The herbal raw material is long *Curcuma* (*Curcumae longae* rhizoma), containing at least 3% dicinoylmethane derivatives (curcuminoids) calculated as curcumin and at least 3% oil (mainly sesquiterpenes) relative to dry raw material. Curcumin has been shown to inhibit TPA-induced inflammation, hyperplasia and proliferation. Turmeric rhizome inhibited the inflammatory response caused by the use of bleomycin and amiodarone in rats, preventing pulmonary fibrosis. The anti-inflammatory effect of turmeric has been associated with inhibition of arachidonic acid metabolism in murine epithelium. Studies have shown that the average effective dose of curcumin in the carrageenan test was ED50=48 mg/kg in rats and ED50=100.2 mg/kg in mice. For the turmeric alcohol extract in mice, ED50=309.0 mg/kg, for aqueous extract ED50=4.7 mg/kg, for petroleum ether extract ED50=40.7 mg/kg, and for curcumin alone ED50=8.7 mg/kg. *Curcuma longa* rhizome can be used to treat some chronic inflammatory diseases. Nahar et al. conducted experiments on a preparation containing a solid complex of lipids with curcumin. The in vitro activity of this preparation on lipopolysaccharide (LPS) induced inflammation was tested in the RAW 264.7 mouse macorophage line. The use of the preparation significantly reduced the concentration of nitric oxide and prostaglandin E2 and the concentration of interleukin-6 depending on the dose. Inhibition of the transcription factor NF-κB has also been found. The results of pharmacological studies presented have shown the inhibitory effect of turmeric components on cyclooxygenase activity in murine epidermal microsomes and lipoxygenase in cytosol. In the Ames test, both the turmeric water extract and the isolated curcumin were not mutagenic.

*Coptis* is used to treat many diseases in traditional Japanese, Chinese and Indian medicine. Taking into account the documented pharmacological properties of isoquinoline alkaloids raw materials, the following scope of action can be given: diastolic, cholagogue, protozoicidal, bacteriostatic and bactericidal, fungistatic, hypotensive, sedative, antipyretic, analgesic, cytotoxic, antiparasitic. *Coptis* inhibits the release of toxins by bacterial cells. *Coptis* limits in vitro growth of staphylococci, streptococci, pneumococci, *Vibrio cholerae, Bacillus anthracis,* and *Dysenteriae Bacillus. Coptis* preparations are successfully used to treat *Leishmania* infections (leishmaniasis). *Coptis* extracts, like other herbs containing berberine—destroy numerous pathogenic protozoa, e.g. *Entamoeba histolytica, Giardia lamblia* and *Trichomonas vaginalis*. Some authors (e.g. John Chen & Tina Chen, 2004) report that *Coptis* has an extremely broad spectrum of antibacterial activity: *Bacillus dysenteriae, Mycobacterium tuberculosis, Salmonella typhi, E. coli, Vibrio cholerae, Bacillus proteus, Pseudomonas aeruginosa, Diplococcus meningitis, Staphylococcus aureus,* beta-hemolytic *streptococcus, Diplococcus pneumoniae, Corynebacterium diphtheriae, Bordetella pertussis, Bacillus anthracis* and *Leptospira*. They believe that *Coptis* markedly inhibits the development of *E. coli, Mycobacterium tuberculosis* and *Staphylococcus aureus*. *Coptis Chinensis* external preparations have found application in the treatment of: inflammation of the mouth and throat, inflammation of the skin, infections of the skin and mucous membranes of the genital organs, conjunctivitis and eyelids, eye parasitic diseases, psoriasis, dandruff, proctitis, vaginal discharge as a result of genital tract infection, mycoses of the skin and mucous membranes (strong decoctions and water-alcohol extracts), boils, purulent skin diseases, acne.

Therefore, a carrier is sought to ensure dissolution or emulsification of both water-soluble active substances and fat-soluble active substances and, at the same time, increasing their bioavailability, thanks to which it is possible to reduce the doses of these substances while increasing their activity and additionally allowing obtaining a semi-solid mixture with high homogeneity and uniformity with a low degree of impurities, and a composition containing it. Unexpectedly, the said problem was solved by the present invention.

The first object of the invention is a pharmaceutical carrier for active substances characterized in that it contains a strongly solvating aprotic solvent from the group of sulfoxides, carbonic acid amide, and vegetable oil with a high content of unsaturated fatty acids. Preferably, the carrier according to the invention is characterized in that the strongly solvating aprotic solvent from the group of sulfoxides is selected from the group comprising dimethyl sulfoxide. Equally preferably, the carrier according to the invention is characterized in that the carbonic acid amide is selected from the group of absorption promoters comprising urea, caffeine or caffeine. In a further preferred embodiment of the invention, the carrier is characterized in that the vegetable oil with a high content of unsaturated fatty acids is selected from the group comprising Chaulmoogra oil, sunflower oil, vegetable oils, preferably linseed oil, rapeseed oil, peanut oil, hemp oil. In another equally preferred embodiment of the invention, the carrier is characterized in that it additionally comprises a natural emulsifier, preferably selected from the group comprising white wax, vegetable waxes, preferably yellow wax, Carnauba wax, lanolin. In another equally preferred embodiment of the invention, the carrier is characterized in that it contains a substance from the group of sulfoxides as a strongly solvating aprotic solvent in an amount of 0.01% to 5% by weight of the drug. More preferably, the carrier according to the invention is characterized in that it contains a carbonic acid amide in an amount of 0.01% to 2% by weight of the drug. Equally preferably, the carrier according to the invention is characterized in that it contains vegetable oil with a high content of unsaturated fatty acids in an amount of 1% to 5% by weight of the drug. Most preferably, the carrier according to the invention is characterized in that it contains a natural emulsifying substance in an amount of 0.001% to 8% by weight of the drug.

The second object of the invention is a pharmaceutical composition characterized in that it comprises a carrier as defined in the first object of the invention and an active substance, wherein the active substances to carrier ratio is from 1:10 to 2:1 and the carrier constitutes from 1% to 20% by weight of the composition. Equally preferably, the composition according to the invention is characterized in that it comprises a substrate, wherein the weight ratio of active substances to excipients is from 1:2.5 to 1:494, and preferably it has a semi-solid drug form. More preferably, the composition according to the invention is characterized in that it comprises active substances selected from the group containing active substances of natural or synthetic origin, preferably Coptis Chinesis extracts, Curcuma Longa extracts or combinations thereof. In another preferred embodiment of the invention, the composition is characterized in that the substrate components are selected from the group comprising pork lard, more preferably duck lard and/or goose lard and/or eucerine, more preferably Lekobaza, Hascobaza, white petrolatum, yellow petrolatum and/or zinc sulfate—zinc salts, any combination thereof, most preferably pork lard, goose lard, eucerine and zinc sulfate.

The mixture of excipients creates a carrier characterized by its effect on the bioavailability of active substances. For example, a semi-solid carrier of active substances was made using the following excipients: A, preferably Dimethyl sulfoxide (DMSO), B, preferably Urea (Urea), D, Chaulmoogra oil (Oleum Chaulmoogra), additionally C, preferably white wax (Cera alba)

The proportions of the carrier components are shown in Table 1.

TABLE 1

| A % | B % | C % | D % |
|---|---|---|---|
| 11.85 | 47.42 | 2.37 | 38.36 |

A-DMSO, B-UREA, C-White wax, D-Chaulmoogra oil

The mixture of substances constituting a carrier consists of elements ensuring dissolution or emulsification of both water-soluble active substances and fat-soluble active substances. Mixture A-B is responsible for the dissolution of hydrophilic active substances. Mixture AD, preferably additionally C, is responsible for the dissolution of lipophilic substances. Mixture A-B, preferably additionally C, is responsible for emulsifying properties.
- the minimum amount of A used in the carrier must not be lower than 0.01% of the total weight of the drug and must not exceed 5% of the total weight of the drug.
- the minimum amount of B used in the carrier must not be lower than 0.01% of the total weight of the drug and must not exceed 2% of the total weight of the drug.
- the minimum amount of C used in the carrier must not be lower than 0.001% of the total weight of the drug and must not exceed 8% of the total weight of the drug, wherein the compounds of group C need not be used in the basic carrier of the invention.
- the minimum amount of D used in the carrier must not be lower than 1% of the total weight of the drug and must not exceed 5% of the total weight of the drug.

The aim of the invention is to obtain a universal carrier of active substances increasing their bioavailability, thanks to which it is possible to reduce the doses of these substances while increasing their activity. The effect is to accelerate the treatment of inflammation and shorten the treatment of skin ulcers.

The current state of knowledge shows that no ABD, preferably additionally C, containing mixture was used for this purpose, in particular Chaulmoogra oil, DMSO, urea and white wax.

Figure 2:
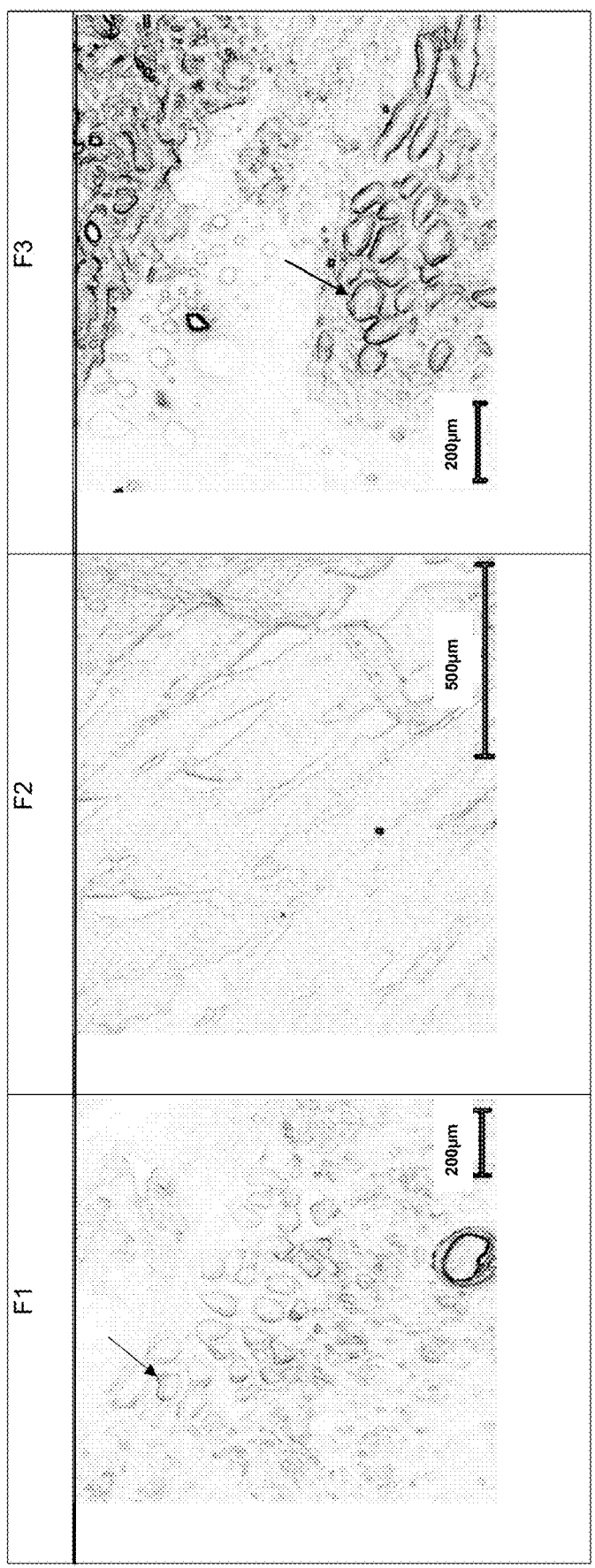
Figure 3:
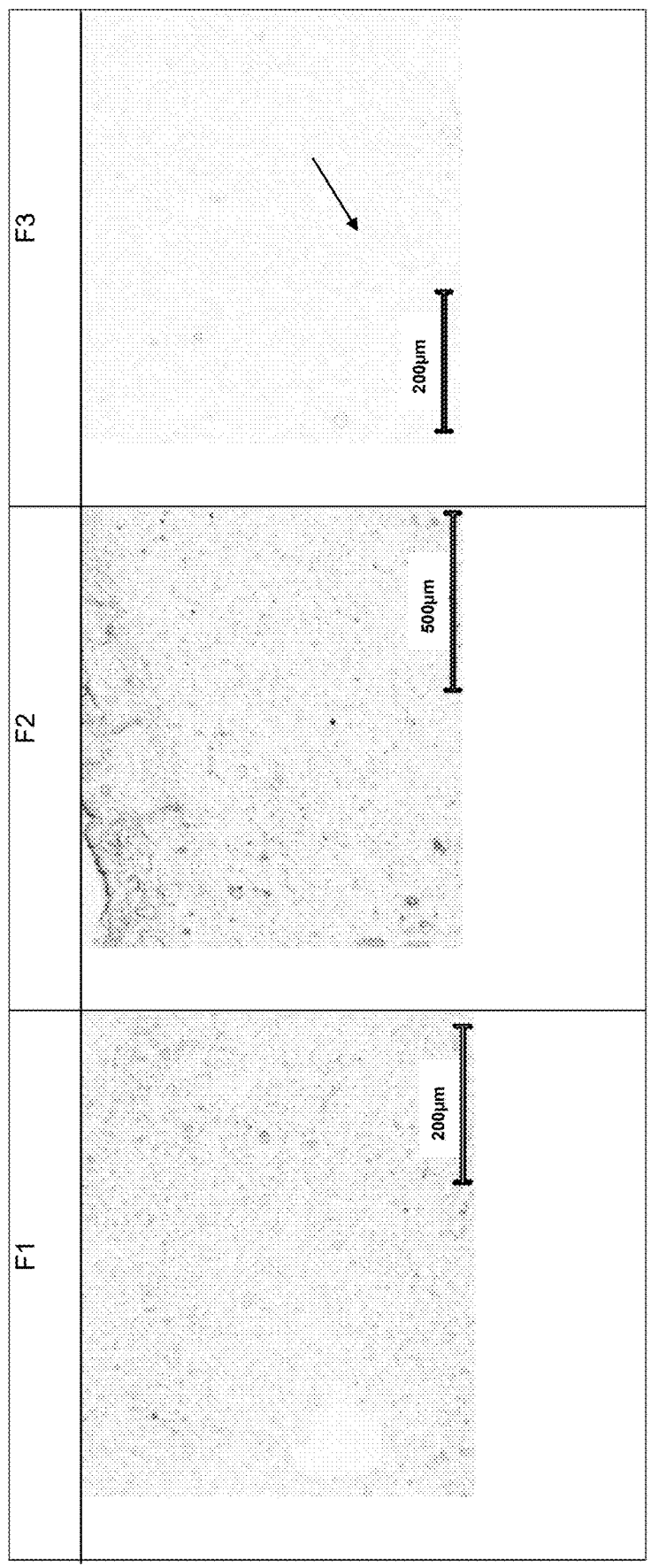
Figure 4:
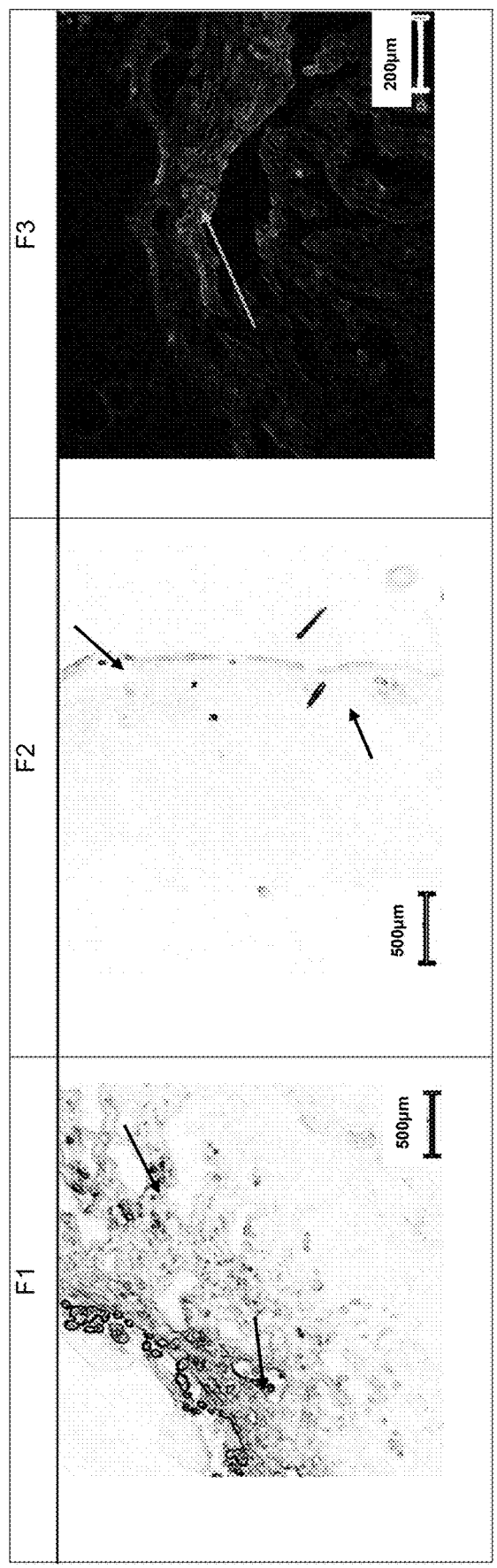
Figure 5:
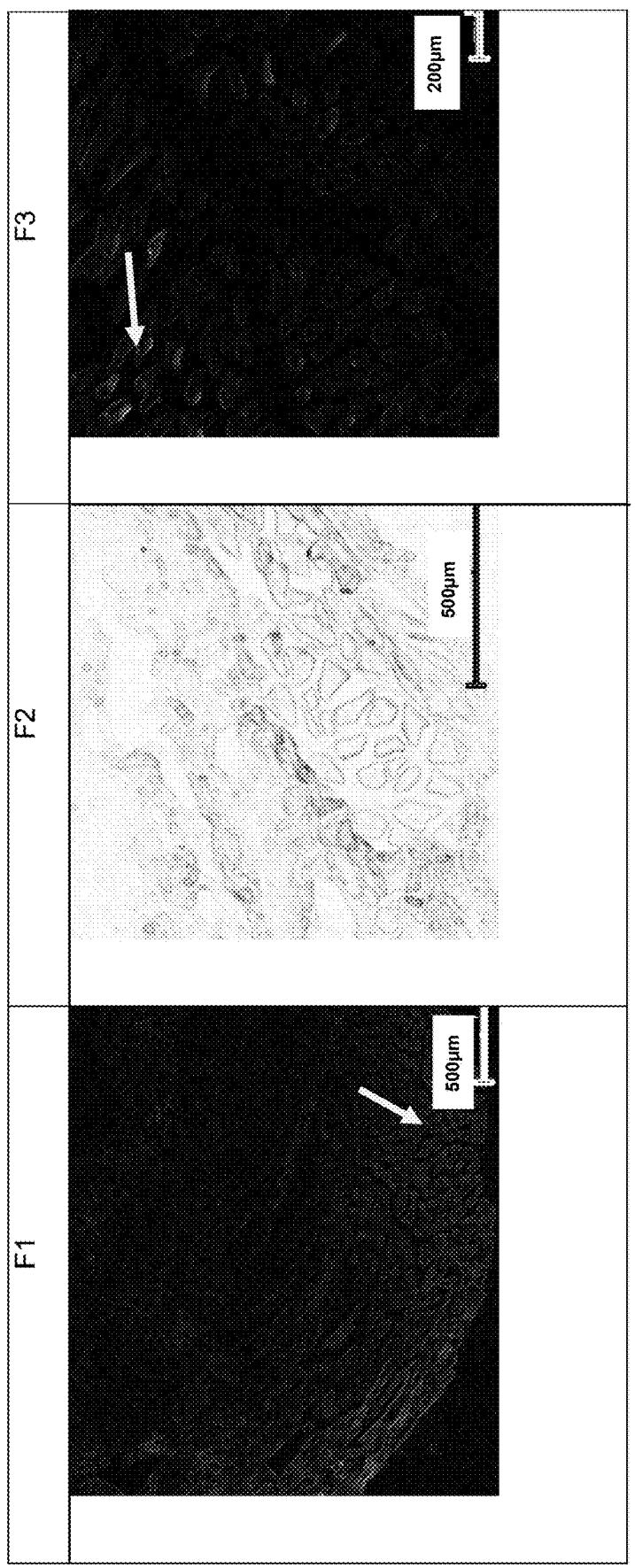
Figure 8:
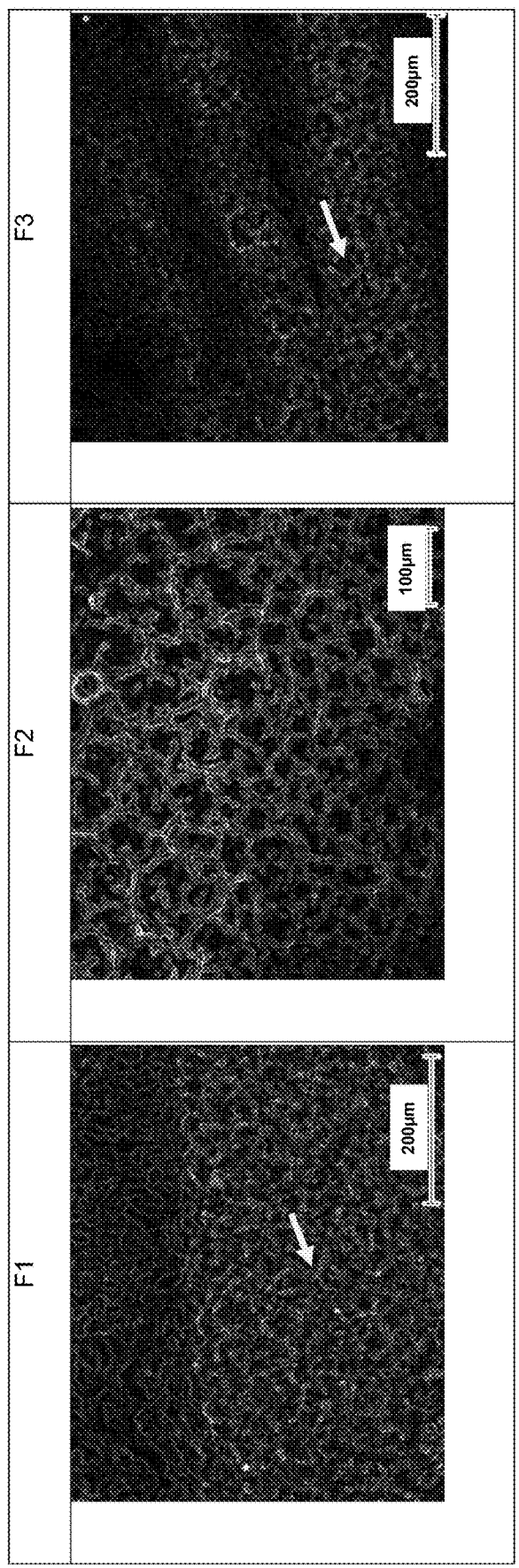
Figure 9:
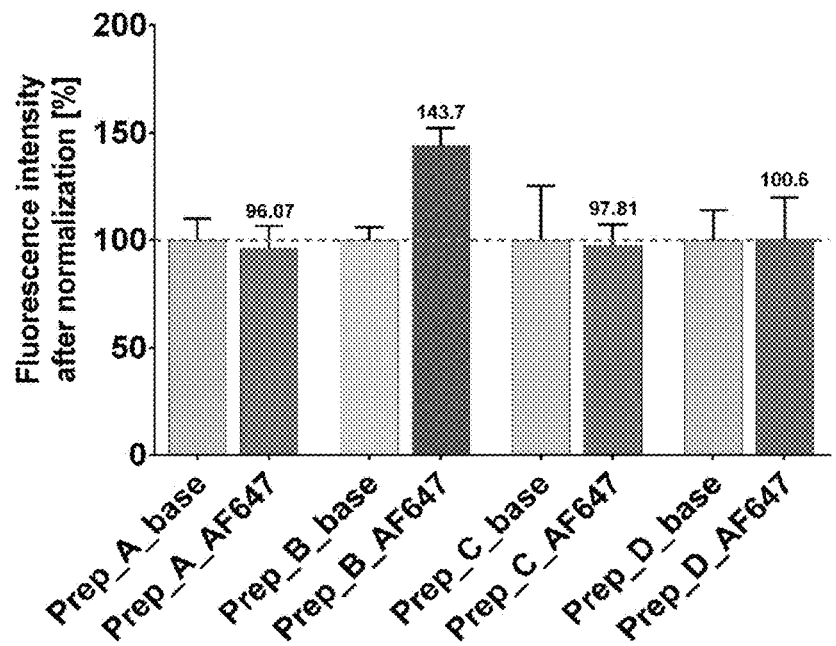
Figure 10:
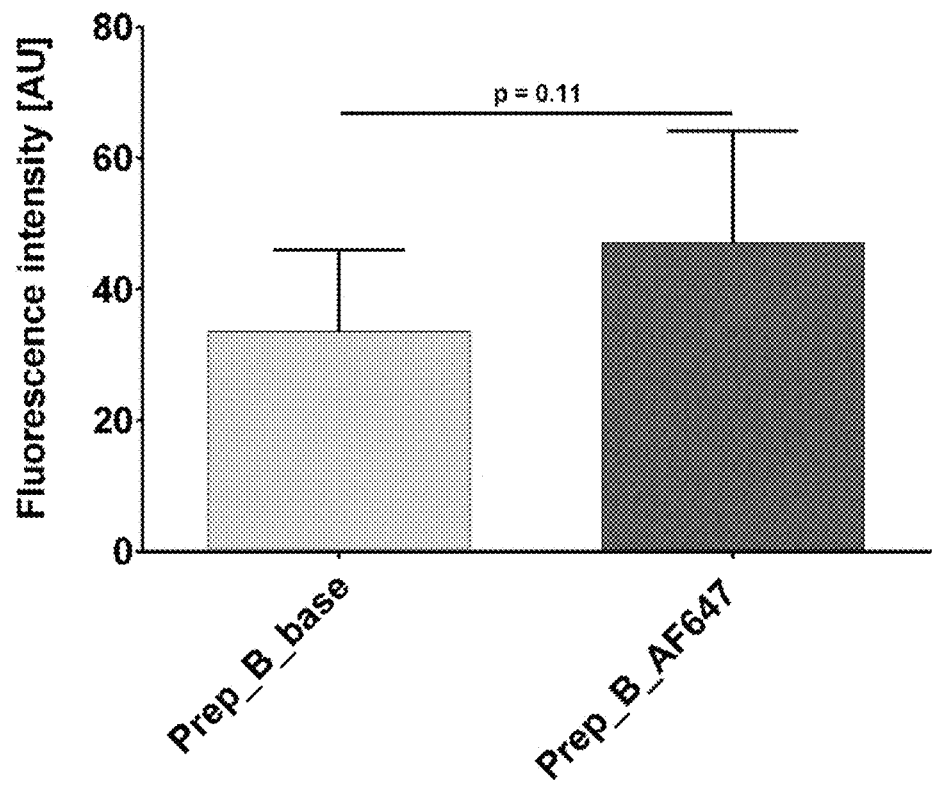

Exemplary embodiments of the invention are shown in FIG. 1, which shows the activity of a medicinal product containing substances from the group of sodium-glucose co-transporter 2 (SGLT2) inhibitors (fluoroscein); FIG. 2 (fluorescein) shows positive response in the form of green emission in the muscles adjacent to the fluorochrome injection site and lack of positive response in F2 group; FIG. 3 (fluorescein) illustrates the sample of liver cells—strongly positive response in F3 group (complete staining of liver cells and intercellular spaces), negative response in the remaining groups, 400× magnification; FIG. 4 (acridine orange) illustrates the strongly positive response in the form of green light emission in the dermis and subcutaneous layer, the strongest in F1 and F3 groups (arrow), in F3 group a positive response occurs only on the surface of the epidermis, 40× magnification; FIG. 5 (acridine orange) shows muscle tissue, a positive response is visible, i.e. similar to that seen in the skin, wherein the contrast of the image had to be modified to show the signal at low magnification. Negative response was observed in F2 group (strong contrast-enhancement of the image, 100×, 100× and 400× magnification), FIG. 6 (acridine orange) shows liver cells sample, positive response occurred in F3 group (arrow), in other groups negative result was observed, 400× magnification; in FIG. 7 (rhodamine)—a sample of connective tissue cells—the strongest positive response was observed in F1 and F3 groups, 100×, 100× and 40× magnification; FIG. 8 (rhodamine)—liver sample—weak positive response visible in F1 and F3 groups (100× magnification); FIG. 9 shows normalized values, where the mean value of the fluorescence intensity of the test tissue is the percentage of the control tissue fluorescence intensity (100%) treated with the vehicle without the antibody; FIG. 10 shows the absolute values of the mean fluorescence intensity of the test preparation B in the dermis; FIG. 11 is a plot of normalized fluorescence intensity in the dermis compared to the control carrier (100%); FIG. 12 illustrates the nonparametric Kruskal-Wallis analysis of variance (ANOVA) of the obtained comparison results of all tested samples ("'z' value for multiple comparisons; W, independent variable (grouping):S; Kruskal-Wallis test: H (7, N=24)=14.69333, p=, 0401"). FIG. 13 and FIG. 14 show the results of the tests described in Example 35.

EXAMPLE 1

The carrier mixture (F1) was prepared in the following steps:
a) vegetable oil with a high content of unsaturated fatty acids and optionally a natural emulsifying substance were melted in the vessel at max. 40° C.,
b) a strongly solvating aprotic solvent from the group of sulfoxides was added while stirring to the molten mixture of vegetable oil with a high content of unsaturated fatty acids and optional natural emulsifying substance.

An appropriate amount of carbonic acid amide was added to the mixture of strongly solvating aprotic solvent from the group of sulfoxides and vegetable oil with a high content of unsaturated fatty acids—D, and optionally a natural emulsifying substance.

The obtained mixture was stirred until a homogeneous consistency and color were obtained.

The resulting mixture showed emulsifying properties. Hydrophilic substances dissolved in the molten mixture. Lipophilic substances dissolved in the room temperature mixture.

In subsequent steps, mixtures F2 and F3 were prepared. A list of compositions of mixtures used for the tests is presented in Table 2.

TABLE 2

| Substances used | mixture | | |
|---|---|---|---|
|  | F1 | F2 | F3 |
| DMSO | + |  | + |
| Urea | + | + | + |
| Cera alba | + | + |  |
| Oleum Chaulmoogra | + | + | + |

Mixture F2 lacked a strongly solvating aprotic solvent from the group of sulfoxides (DMSO). The mixture showed emulsifying properties. Lipophilic substances dissolved in the mixture at room temperature. Hydrophilic substances did not dissolve in mixture F2.

Mixture F3 lacked a natural emulsifier (Cera *alba*). Lipophilic substances dissolved in the mixture at room temperature. Hydrophilic substances dissolved in the F3 mixture at about 40° C. Mixture F3 did not show emulsifying properties.

The tests shown that the F1 mixture has the most universal properties.

EXAMPLE 2

The carrier mixture (F1) was made in the following steps:
a) vegetable oil with a high content of unsaturated fatty acids in an amount of 1% of the total drug weight, and optionally a natural emulsifying substance in an amount of 0.001% of the total drug weight, were melted in the vessel at max. 40° C.
b) a strongly solvating aprotic solvent from the group of sulfoxides in an amount of 0.01% of the total drug weight was added while stirring to the molten mixture of vegetable oil with a high content of unsaturated fatty acids in an amount of 1% of the total drug weight, and optionally a natural emulsifying substance in an amount of 0.001% of the total drug weight.

A carbonic acid amide in an amount of 0.01% of the total drug weight was added to the mixture of strongly solvating aprotic solvent from the group of sulfoxides in an amount of 0.01% of the total drug weight and vegetable oil with a high content of unsaturated fatty acids in an amount of 1% of the total drug weight—D, and optionally a natural emulsifying substance in an amount of 0.001% of the total drug weight.

The obtained mixture was stirred until a homogeneous consistency and color were obtained.

The resulting mixture showed emulsifying properties. Hydrophilic substances dissolved in the molten mixture. Lipophilic substances dissolved in the room temperature mixture.

EXAMPLE 3

The carrier mixture (F1) was made in the following steps:
a) vegetable oil with a high content of unsaturated fatty acids in an amount of 5% of the total drug weight, and optionally a natural emulsifying substance in an amount of 8% of the total drug weight, were melted in the vessel at max. 40° C.
b) a strongly solvating aprotic solvent from the group of sulfoxides in an amount of 5% of the total drug weight was added while stirring to the molten mixture of vegetable oil with a high content of unsaturated fatty acids in an amount of 5% of the total drug weight, and optionally a natural emulsifying substance in an amount of 8% of the total drug weight.

A carbonic acid amide in an amount of 2% of the total drug weight was added to the mixture of strongly solvating aprotic solvent from the group of sulfoxides in an amount of 5% of the total drug weight and vegetable oil with a high content of unsaturated fatty acids in an amount of 5% of the total drug weight—D, and optionally a natural emulsifying substance in an amount of 8% of the total drug weight.

The obtained mixture was stirred until a homogeneous consistency and color were obtained.

The resulting mixture also showed emulsifying properties. Hydrophilic substances dissolved in the molten mixture. Lipophilic substances dissolved in the room temperature mixture.

As a consequence of the implementation of examples 1, 2 and 3, it was proved that within the quantitative (percentage) ranges of the individual components used in the carrier, a mixture was obtained meeting the assumptions of the first subject of the invention.

The second object of the invention is the use of the above-described carrier in a semi-solid drug form and a unique mixture of active substances in a properly selected proportion. Active substances are all synthetic substances and substances of natural origin, e.g. a mixture of *Coptis Chinensis* and *Curcuma Longa* extracts. The weight ratio between the active substances and the carrier should range from 1:10 to 2:1. The percentage given is the concentration in 100 parts of the finished product. The carrier constitutes from 1.0 to 20% by weight of the finished product.

The basis for the substrate is mixtures obtained from pork lard in an amount from 5 to 20%, goose lard in an amount from 4 to 15%, eucerine in an amount from 12 to 21% and zinc sulfate in an amount from 0.5 to 2%, wherein the weight ratio of active substances to excipients is from 10:90 to 1:999 and it has the form of a semi-solid drug preparation characterized in that it includes:
a) mixing lipophilic substances with part of the extracts to achieve levigation of extracts, preferably in an amount from 0.1% to 5%, with substrate needed for the whole process, in the temperature range 20-50° C., in pharmaceutical and food mixers up to 4000 RPM, for at least 3 minutes.
b) mixing the resulting mixture from step a) with a portion, preferably from 6% to 90%, of the remaining amount of substrate needed for the whole process, in the temperature range 20-50° C., in pharmaceutical and food mixers up to 5000 RPM, for at least 3 minutes.
c) mixing the resulting mixture from step b) with the remaining amount of substrate needed for the whole process and then with the remaining excipients to achieve homogeneity, in the temperature range 20-50° C., in pharmaceutical and food mixers up to 4000 RPM, for at least 3 minutes.
d) Homogenizing in laboratory and industrial (rotary and piston) homogenizers in the temperature range 20-50° C. for at least 5 minutes.

The essence of the invention is to create a homogeneous mixture of the substrate and active substances, containing the evenly dispersed active substance. According to the invention, a semi-solid mixture dispensed into pharmaceutical packaging for ointments was obtained.

EXAMPLE 4

The method for obtaining ointments according to the invention

The product being the subject of the invention, the preferred embodiment of which is shown in Table 3, was prepared according to the following manufacturing technology:

Appropriately weighed amount of plant extracts were mixed in a rotary homogenizer (1000 RPM for 7 minutes) with 9% of the required amount of carrier, then added to the homogenizer with 5% of the required amount of molten substrate and the whole mixture was levigated in rotary homogenizer (500 RPM for 7 minutes). The remaining amount of carrier was added to the rotary homogenizer, mixed, then the rest of the molten substrate was added and homogenized (2000 RPM for 10 minutes).

The obtained ointment was then transferred to pharmacy packaging for ointments.

TABLE 3

Composition of the product being the subject of the invention:

| No. | Starting material | Amount [g] |
|---|---|---|
| 1 | *Coptis chinensis* and *Curcuma longa* extracts | 10.0 |
| 2 | Carrier | 9.0 |
| 3 | Substrate | 81.0 |

A semi-solid mixture was obtained, homogeneous in terms of active substance content, where the content of the resulting impurities of plant extracts is below the detection level due to the experimentally selected pharmaceutical composition, appropriate fragmentation of the components of this composition and the production technology used.

The selection of the appropriate composition in experimentally selected quantitative proportions and the use of natural medicinal substances, specific excipients and the application of the ointment mixture production technology described above allowed for obtaining a uniform content of active substance in the form of a drug, i.e. in each volume unit there is the same dose of active substance, and found confirmation during the tests.

The study was carried out on the L929 cell line (mouse fibroblasts) from Sigma Aldrich—catalog number 85011425, series number 14G010. Cells from cryotube No. 94 were used for the study. The given cell line was selected for the test based on the PN-ISO 10993-5 standard.

Cytotoxicity testing using the XTT method was carried out in accordance with PN-ISO 10993-5 based on the 'Test Instruction—XTT' (IB 16.4).
Results
viability limit—70%

| Sample 2.1 | |
|---|---|
| For 100% extract | Viability % |
| Repetition 1 | 77.82 |
| Repetition 2 | 76.17 |
| Repetition 3 | 73.17 |
| Mean | 75.72 |
| Standard deviation | 2.36 |

The mean viability is 75.72% (value above 70%*)-the tested material (sample No. 2.1) is not cytotoxic.

| Sample 2.2 | |
|---|---|
| For 100% extract | Viability % |
| Repetition 1 | 71.47 |
| Repetition 2 | 72.51 |
| Repetition 3 | 67.00 |
| Mean | 70.33 |
| Standard deviation | 2.93 |

The mean viability is 70.33% (value above 70%*)-the tested material (sample No. 2.2) is not cytotoxic.

| Sample No. 2.3 | |
|---|---|
| For 100% extract | Viability % |
| Repetition 1 | 73.80 |
| Repetition 2 | 72.33 |
| Repetition 3 | 72.48 |
| Mean | 72.87 |
| Standard deviation | 0.81 |

The mean viability is 72.87% (value above 70%*)-the tested material (sample No. 2.3) is not cytotoxic.

| Sample No. 2.4 | |
|---|---|
| For 100% extract | Viability % |
| Repetition 1 | 71.70 |
| Repetition 2 | 72.60 |
| Repetition 3 | 68.43 |
| Mean | 70.91 |
| Standard deviation | 2.20 |

The mean viability is 70.91% (value above 70% *)-the tested material (sample No. 2.4) is not cytotoxic.

| Sample No. 2.5 | |
|---|---|
| For 100% extract | Viability % |
| Repetition 1 | 70.82 |
| Repetition 2 | 70.64 |
| Repetition 3 | 69.57 |
| Mean | 70.35 |
| Standard deviation | 0.68 |

The mean viability is 70.35% (value above 70% *)-the tested material (sample No. 2.5) is not cytotoxic.

SUMMARY

The mean viability % for all five samples was above 70%*—the results indicate that the test material is not cytotoxic.

In addition, the use of a carrier ensures protection of the active substance against the adverse effects of external environmental conditions, i.e. resistance to temperature and light during the technological process.

EXAMPLE 5. THE METHOD OF OBTAINING OINTMENTS ACCORDING TO THE INVENTION

The product being the subject of the invention, the preferred embodiment of which is shown in Table 3, was prepared according to the following manufacturing technology:

Appropriately weighed amount of plant extracts was mixed with 100% of the required amount of carrier in a rotary homogenizer (1000 RPM for 7 minutes, at room temperature), then heated in a water bath until the mixture-1 liquefied. Then, 25% of the required amount of substrate was added to the liquefied mixture, which was then mixed until a homogeneous consistency (mixture-2) was obtained. The remaining amount of substrate was added to the rotary homogenizer, mixed (500 RPM, 7 minutes, at room temperature) with the liquefied mixture-2, and then the whole mixture was homogenized (2000 RPM for 10 minutes).

The mixture of the ointment received was transferred to pharmacy packaging for ointment.

TABLE 3

Composition of the product being the subject of the invention:

| No. | Starting material | Amount [g] |
|---|---|---|
| 1. | *Coptischinensis i Curcumalonga* extracts | 38.0 |
| 2. | Carrier | 19.0 |
| 3. | Substrate | 43.0 |

A semi-solid mixture was obtained, homogeneous in terms of the content of active substances, where the content of the resulting impurities of plant extracts is below the detection level due to the experimentally selected pharmaceutical composition, appropriate fragmentation of the components of this composition and the production technology used, which was confirmed by tests that allow determining the following product parameters:

Iodine number (A)
Method (Ph. Eur.): titration
Iodine number 41.20

The iodine number in the number of grams of elements from the halogens group, calculated as iodine, which is attached to specific double bonds present in fatty acids found in 100 grams of the product tested. Iodine value determines the level of fat unsaturation, so it can be used to identify and parameterize the product. The product, depending on the origin of the fat raw material, may differ within certain limits in the composition of fatty acids, and therefore also the iodine number.

Apparent viscosity (A)
Method (Ph. Eur.): viscometric
Apparent viscosity 836.7 mPaxs The result of the test will be necessary to determine the product standard. At this level of viscosity, it is possible to maintain the active substances in the form of a homogeneous mixture.

The selection of the appropriate composition in experimentally selected quantitative proportions and the use of natural medicinal substances, specific excipients and the application of the ointment mixture production technology described above allowed for obtaining a uniform content of active substance in the form of a drug.

In addition, the use of a carrier ensures protection of the active substance against the adverse effects of external environmental conditions during the technological process.

Acid number (A)
Method (Ph. Eur.): titration
Acid number 0.12

The conducted study (acid number) allowed to determine the content of free fatty acids (degree of fat hydrolysis) in the tested product.

Saponification number (A)
Method (Ph. Eur.): titration
Saponification number 96.2

The study allowed to determine the average molecular weight of fatty acids. The result of the test is the number of milligrams of potassium hydroxide needed to neutralize free fatty acids and saponify the acylglycerols contained in 1 g of test product.

Dropping point
Method (Ph. Eur.): Visual evaluation
Melting point 24.0° C.±2%

The result of the test will be necessary to determine the product standard.

Peroxide value (USP) (A)
Method (USP): titration
Peroxide value 0.20

The peroxide value is the peroxide content and is treated as an indicator of the degree of oxidation (rancidity) of fat. The value obtained for product is within the normal range.

EXAMPLE 6. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1) | 20 |
| Active substances (total) | 2 |
| Substrate | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate described in Example 4 (80 g) while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 7. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1) | 1 |
| Active substances (total) | 0.1 |
| Substrate | 98.9 |

The composition ratio of the F1 carrier described in Example 1 was used in the experiment. The active substances in an amount of:

vitamin A—0.05 g vitamin C—0.05 g were added to the carrier composition in an amount of 1 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate described in Example 4 (98.8 g) while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:99.

EXAMPLE 8. METHOD OF PREPARATION OF MEDICINAL PRODUCT CONTAINING LIPOPHILIC AND HYDROPHILIC SUBSTANCES

Equal amounts of substances from the group of vitamins were used as reference substances:

a) vitamin A—fat-soluble substance b) vitamin C—water-soluble substance

| Composition | % |
| --- | --- |
| Carrier (F1) | 20 |
| Active substances (total) | 40 |
| Substrate | 40 |

The composition ratio of the F1 carrier described in Example 1 was used in the experiment. The active substances in an amount of:

vitamin A—20 g vitamin C—20 g were added to the carrier composition in an amount of 20 g, obtained according to procedure described for F1 and molten at 40 degrees Celsius.

After mixing (400 RPM) for about 10 minutes, a homogeneous mixture was obtained and the substances used dissolved completely after mixing. The mixture thus obtained was added to the remaining amount of the substrate described in Example 4 (40 g) while stirring (500 RPM) for 8 minutes.

As a result, a preparation of homogeneous consistency and color was obtained with uniformly levigated substances, where the ratio between the active substance and the carrier was 2:1 and the ratio between the carrier and the substrate was 1:2, and an amount of carrier constituted 20% of the total weight of the final product.

EXAMPLE 9. METHOD OF PREPARATION OF MEDICINAL PRODUCT CONTAINING LIPOPHILIC AND HYDROPHILIC SUBSTANCES

Equal amounts of substances from the group of vitamins were used as reference substances:

a) vitamin A—fat-soluble substance b) vitamin C—water-soluble substance

| Composition | % |
| --- | --- |
| Carrier (F1) | 1 |
| Active substances (total) | 2 |
| Substrate | 97 |

The composition ratio of the F1 carrier described in Example 1 was used in the experiment. The active substances in an amount of:

vitamin A—1 g vitamin C—1 g were added to the carrier composition in an amount of 1 g, obtained according to procedure described for F1 and molten at 40 degrees Celsius.

After mixing (400 RPM) for about 10 minutes, a homogeneous mixture was obtained and the substances used dissolved completely after mixing. The mixture thus obtained was added to the remaining amount of the substrate described in Example 4 (97 g) while stirring (500 RPM) for 8 minutes.

As a result, a preparation of homogeneous consistency and color was obtained with uniformly levigated substances, where the ratio between the active substance and the carrier was 2:1 and the ratio between the carrier and the substrate was 1:2, and an amount of carrier constituted 1% of the total weight of the final product.

EXAMPLE 10. METHOD OF PREPARATION OF MEDICINAL PRODUCT CONTAINING LIPOPHILIC AND HYDROPHILIC SUBSTANCES

Equal amounts of substances from the group of vitamins were used as reference substances:

a) vitamin A—fat-soluble substance b) vitamin C—water-soluble substance

| Composition | % |
| --- | --- |
| Carrier (F1) | 20 |
| Active substances (total) | 2 |
| Substrate (Lekobaza) | 80 |

The composition ratio of the F1 carrier described in Example 1 was used in the experiment. The active substances in an amount of:

vitamin A—1 g vitamin C—1 g were added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of Lekobaza was used) while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 11. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1) | 20 |
| Active substances (total) | 2 |
| Substrate (Hascobaza) | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of Hascobaza was used) while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 12. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1) | 20 |
| Active substances (total) | 2 |
| Substrate (yellow vaseline) | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of yellow vaseline was used) while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 13. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1) | 20 |
| Active substances (total) | 2 |
| Substrate (white vaselin) | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of white vaseline was used) while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 14. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1) | 20 |
| Active substances (total) | 2 |
| Substrate (Lekobaza/goose lard) | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of Lekobaza was used, and pork lard was used instead of goose lard) while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 15. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1) | 20 |
| Active substances (total) | 2 |
| Substrate (Hascobaza/duck lard) | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of Hascobaza was used, and duck lard was used instead of goose lard) while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 16. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1) | 20 |
| Active substances (total) | 2 |
| Substrate (white vaseline/pork lard/zinc chloride) | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of white vaseline was used, pork lard was used instead of goose lard, and instead of zinc sulfate, an analogous amount of zinc chloride was used) while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 17. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1-Linseed oil) | 20 |
| Active substances (total) | 2 |
| Substrate | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 (with one important difference: instead of Chaulmoogra oil, an analogous amount of linseed oil was used) and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 18. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1-Rapeseed oil) | 20 |
| Active substances (total) | 2 |
| Substrate | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 (with one important difference: instead of Chaulmoogra oil, an analogous amount of rapeseed oil was used) and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 19. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1-Archis oil) | 20 |
| Actice substances (total) | 2 |
| Substrate | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 (with one important difference: instead of Chaulmoogra oil, an analogous amount of *arachis* oil was used) and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 20. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1-Sunflower oil) | 20 |
| Active substances (total) | 2 |
| Substrate | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 (with one important difference: instead of Chaulmoogra oil, an analogous amount of sunflower oil was used) and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 21. METHOD OF PREPARATION OF MEDICINAL PRODUCT CONTAINING LIPOPHILIC AND HYDROPHILIC SUBSTANCES

Equal amounts of substances from the group of vitamins were used as reference substances:
a) vitamin A—fat-soluble substance
b) vitamin C—water-soluble substance

| Composition | % |
|---|---|
| Carrier (F1-Hemp oil) | 20 |
| Active substances (total) | 2 |
| Substrate | 80 |

The composition ratio of the F1 carrier described in Example 1 was used in the experiment. The active substances in an amount of:
vitamin A—1 g
vitamin C—1 g
were added to the carrier composition in an amount of 20 g, obtained according to procedure described for F1 (with one important difference: instead of Chaulmoogra oil, an analogous amount of hemp oil was used) and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 22. METHOD OF PREPARATION A MEDICINAL PRODUCT CONTAINING SUBSTANCES FROM THE GROUP OF SODIUM-GLUCOSE CO-TRANSPORTER 2 INHIBITORS (SGLT2)

Substances from the group of sodium-glucose co-transporter 2 (SGLT2) inhibitors were used as a reference substance:
Dapagliflozin Propanediol Dapagliflozin is a very potent (Ki: 0.55 nM), selective and reversible inhibitor of sodium-glucose co-transporter 2 (SGLT2).

SGLT2 is selectively expressed in the kidneys, with a simultaneous lack of this type of expression in more than 70 other types of tissue (including liver, muscle tissue, adipose tissue, breasts, bladder and brain). SGLT2 is the main transporter responsible for glucose reabsorption from glomerular filtration into the blood. In type 2 diabetes, glucose reabsorption is still taking place in the kidneys, despite existing hyperglycemia. Dapagliflozin improves fasting and postprandial glucose control by reducing renal glucose reabsorption, leading to urinary glucose excretion. Glucose excretion is observed after the first dose and continues during the 24-hour interval between doses and persists throughout the treatment period. An amount of glucose removed by the kidneys due to their mechanism of action depends on blood glucose levels and the degree of glomerular filtration rate (GFR). Dapagliflozin does not interfere with normal endogenous glucose production in response to hypoglycemia. Dapagliflozin works independently of the secretion and action of insulin. Improvement in HOMA beta-cell (homeostasis model assessment of beta cell function) was observed in clinical studies.

Urinary glucose excretion induced by dapaliflozine is associated with calorie expenditure and weight loss. Inhibition of glucose and sodium co-transport by dapagliflozin is also associated with mild diuresis and transient natriuresis.

Dapagliflozin does not inhibit other glucose transporters important for glucose transport to peripheral tissues and is >1400 times more selective for SGLT2 than for SGLT1, the main transporter responsible for glucose absorption in the intestines.

The composition ratio of the F1 carrier described in Example 1 was used in the experiment. An active substance in an amount of 5 mg was added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 while stirring (500 RPM) for 8 minutes.

As a result, a preparation of homogeneous consistency and color was obtained with uniformly levigated substances, where the ratio between the active substance and the carrier was 1:10 and the ratio between the carrier and the substrate was 1:5.

EXAMPLE 23. METHOD OF PREPARATION OF A MEDICINAL PRODUCT CONTAINING SUBSTANCES FROM THE GROUP OF SODIUM-GLUCOSE CO-TRANSPORTER 2 INHIBITORS (SGLT2)

Substances from the group of sodium glucose co-transporter 2 (SGLT2) inhibitors were used as a reference substance:
Dapagliflozin Propanediol The composition ratio of the F1 carrier described in Example 1 was used in the experiment. An active substance in an amount of 10 mg was added to the carrier composition in an amount of 1 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (98.8 g) described in Example 4 while stirring (500 RPM) for 8 minutes.

As a result, a preparation of homogeneous consistency and color was obtained with uniformly levigated substances, where the ratio between the carrier and the substrate was 1:99.

EXAMPLE 24. METHOD OF PREPARATION A MEDICINAL PRODUCT CONTAINING SUBSTANCES FROM THE GROUP OF SODIUM-GLUCOSE CO-TRANSPORTER 2 INHIBITORS (SGLT2)

Substances from the group of sodium-glucose co-transporter 2 (SGLT2) inhibitors were used as a reference substance:
Dapagliflozin Propanediol The composition ratio of the F1 carrier described in Example 1 was used in the experiment. A part of the carrier described in Example 4 in an amount of 20 g was added to the carrier composition in an amount of 20 g, obtained according to procedure described for F1 and molten at 40 degrees Celsius, followed by active substance in an amount of 20 mg.

After mixing (400 RPM) for about 10 minutes, a homogeneous mixture was obtained and the substances used dissolved completely after mixing. The mixture thus obtained was added to the remaining substrate (20 g) described in Example 4 while stirring (500 RPM) for 8 minutes.

As a result, a preparation of homogeneous consistency and color was obtained with uniformly levigated substances, where the ratio between the carrier and the substrate was 1:2, and an amount of carrier constituted 20% of the total weight of the final product.

EXAMPLE 25. METHOD OF PREPARATION A MEDICINAL PRODUCT CONTAINING SUBSTANCES FROM THE GROUP OF SODIUM-GLUCOSE CO-TRANSPORTER 2 INHIBITORS (SGLT2)

Substances from the group of sodium-glucose co-transporter 2 (SGLT2) inhibitors were used as a reference substance:
Dapagliflozin Propanediol The composition ratio of the F1 carrier described in Example 1 was used in the experiment. A part of the carrier described in Example 4 in an amount of 1 g was added to the carrier composition in an amount of 1 g, obtained according to procedure described for F1 and molten at 40 degrees Celsius, followed by active substance in an amount of 35 mg.

After mixing (400 RPM) for about 10 minutes, a homogeneous mixture was obtained and the substances used dissolved completely after mixing. The mixture thus obtained was added to the remaining substrate (96 g) described in Example 4 while stirring (500 RPM) for 8 minutes.

As a result, a preparation of homogeneous consistency and color was obtained with uniformly levigated substances, where the ratio between the carrier and the substrate was 1:97, and an amount of carrier constituted 1% of the total weight of the final product.

EXAMPLE 26. METHOD OF PREPARATION A MEDICINAL PRODUCT CONTAINING SUBSTANCES FROM THE GROUP OF SODIUM-GLUCOSE CO-TRANSPORTER 2 INHIBITORS (SGLT2)

Substances from the group of sodium-glucose co-transporter 2 (SGLT2) inhibitors were used as a reference substance:
Dapagliflozin Propanediol The composition ratio of the F1 carrier described in Example 1 was used in the experiment. An active substance in an amount of 50 mg was added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of Lekobaza was used) while stirring (500 RPM) for 8 minutes.

As a result, a preparation of homogeneous consistency and color was obtained with uniformly levigated substances, where the ratio between the carrier and the substrate was 1:5.

EXAMPLE 27. METHOD OF PREPARATION A MEDICINAL PRODUCT CONTAINING SUBSTANCES FROM THE GROUP OF SODIUM-GLUCOSE CO-TRANSPORTER 2 INHIBITORS (SGLT2)

Substances from the group of sodium-glucose co-transporter 2 (SGLT2) inhibitors were used as a reference substance:
Dapagliflozin Propanediol The composition ratio of the F1 carrier described in Example 1 was used in the experiment. An active substance in an amount of 70 mg was added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of Hascobaza was used) while stirring (500 RPM) for 8 minutes.

As a result, a preparation of homogeneous consistency and color was obtained with uniformly levigated substances, where the ratio between the carrier and the substrate was 1:5.

EXAMPLE 28. METHOD OF PREPARATION A MEDICINAL PRODUCT CONTAINING SUBSTANCES FROM THE GROUP OF SODIUM-GLUCOSE CO-TRANSPORTER 2 INHIBITORS (SGLT2)

Substances from the group of sodium-glucose co-transporter 2 (SGLT2) inhibitors were used as a reference substance:
Dapagliflozin Propanediol The composition ratio of the F1 carrier described in Example 1 was used in the experiment. An active substance in an amount of 100 mg was added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of yellow vaseline was used) while stirring (500 RPM) for 8 minutes.

As a result, a preparation of homogeneous consistency and color was obtained with uniformly levigated substances, where the ratio between the carrier and the substrate was 1:5.

EXAMPLE 29. METHOD OF PREPARATION A MEDICINAL PRODUCT CONTAINING SUBSTANCES FROM THE GROUP OF SODIUM-GLUCOSE CO-TRANSPORTER 2 INHIBITORS (SGLT2)

Substances from the group of sodium-glucose co-transporter 2 (SGLT2) inhibitors were used as a reference substance:
Dapagliflozin Propanediol The composition ratio of the F1 carrier described in Example 1 was used in the experiment. An active substance in an amount of 105 mg was added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of white vaseline was used) while stirring (500 RPM) for 8 minutes.

As a result, a preparation of homogeneous consistency and color was obtained with uniformly levigated substances, where the ratio between the carrier and the substrate was 1:5.

The composition ratio of the F1 carrier described in Example 1 was used in the experiment. An active substance in an amount of 140 mg was added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of Lekobaza was used, and pork lard was used instead of goose lard) while stirring (500 RPM) for 8 minutes.

As a result, a preparation of homogeneous consistency and color was obtained with uniformly levigated substances, where the ratio between the carrier and the substrate was 1:5.

EXAMPLE 30. METHOD OF PREPARATION A MEDICINAL PRODUCT CONTAINING SUBSTANCES FROM THE GROUP OF SODIUM-GLUCOSE CO-TRANSPORTER 2 INHIBITORS (SGLT2)

Substances from the group of sodium-glucose co-transporter 2 (SGLT2) inhibitors were used as a reference substance:
Dapagliflozin Propanediol The composition ratio of the F1 carrier described in Example 1 was used in the experiment. An active substance in an amount of 210 mg was added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of white Haskobaza was used and duck lard was used instead of goose lard) while stirring (500 RPM) for 8 minutes.

As a result, a preparation of homogeneous consistency and color was obtained with uniformly levigated substances, where the ratio between the carrier and the substrate was 1:5.

EXAMPLE 31. METHOD OF PREPARATION A MEDICINAL PRODUCT CONTAINING SUBSTANCES FROM THE GROUP OF SODIUM-GLUCOSE CO-TRANSPORTER 2 INHIBITORS (SGLT2)

Substances from the group of sodium-glucose co-transporter 2 (SGLT2) inhibitors were used as a reference substance:
Dapagliflozin Propanediol The composition ratio of the F1 carrier described in Example 1 was used in the experiment. An active substance in an amount of 240 mg was added to the carrier composition in an amount of 20 g, obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate (80 g) described in Example 4 (with one important difference: instead of eucerine, an analogous amount of white vaseline was used, pork lard was used instead of goose lard, and instead of zinc sulfate, an analogous amount of zinc chloride was used) while stirring (500 RPM) for 8 minutes.

As a result, a preparation of homogeneous consistency and color was obtained with uniformly levigated substances, where the ratio between the carrier and the substrate was 1:5.

In order to confirm the possibility of transporting substances of different physicochemical nature through the skin and the impact on the bioavailability of these substances, tests were carried out on an animal model using fluorescent markers (fluorescein, rhodamine, acridine orange).

Fluorescein ($C_{20}H_{12}O_5$))—organic chemical compound, xanthene derivative with a molecular weight of 332.31 g/mol being xanthene dye. In alkaline solutions, fluorescein shows green-yellow fluorescence, visible even at a dilution of one to tens of millions.

Acridine orange ($C_{17}H_{19}N_3$))—is an organic compound with a molecular weight of 265.36 g/mol. It is used as a nucleic acid selective cationic fluorescent dye, useful for determining the cell cycle. Because it is membrane-permeable, it interacts with DNA and RNA, respectively, by intercalation or electrostatic interaction.

Rodamine B ($C_{28}H_{31}N_2O_3Cl$)—an organic chemical compound from the rhodamine group with a molecular weight of 479.01 g/mol. Used as a fluorescent dye, i.a. for staining biological preparations.

The test material was initially equilibrated at 4° C. for 1 hour and then frozen. The material was cut in a Leica CM1950 cryostat at −20° C. 10 µm thick sections were fixed in 70% alcohol and mounted in Euperal. The material was analyzed using a Nikon Eclipse 80i fluorescence microscope with a UV-2A (EX450-490, DM-500, BA-515) and B-2A ((EX330-380, DM-400, BA-420) filter. Histological preparations routinely stained with hematoxylin and eosin were made from sections. All the images were taken with a constant exposure time of 400 ms. The selected images were then modified in the Nis elements Ar software to reveal the structure.

The tests were performed on Buffalo rats, randomized and kept separately in cages with toys under standard conditions in the vivarium of the Department of Biostructure and Animal Physiology.

Animals were divided into 12 groups of 3 each.

After shaving the skin on the back near the end segment of the hip ribs and the base of the tail, the preparation has been applied in semi-solid form for 9 days.

Preparations F1, F2, F3 used in the experiment were described in table 2 (1 embodiment).

Fluorescein

In FIG. 1 (fluoroscein) there is strongly positive response visible in the form of green light emission in the dermis and skin layer, the strongest in F3 group (white arrow). In F3 group, a border is visible between lubricated and non-lubricated skin (blue line). Hair with characteristic blue light emission (red arrow) is visible in the skin. No emission in F2 group in the dermis is visible. A positive response is only observed on the surface (white arrow). 40× magnification.

In FIG. 2, a positive response is seen in the form of green emission in the muscles adjacent to the fluorochrome injection site (arrow). No positive response in F2 group. 100× magnification.

In FIG. 3, liver cells and strong positive response in F3 group (complete staining of liver cells and intercellular spaces) is seen. Negative response in other groups. 400× magnification.

The use of this fluorochrome best demonstrates the permeability of the substance through the skin to the muscles and the liver. In the F1 group, a positive signal is observed within the epidermis and muscles attached to the skin. A positive response was also observed in the liver and at the base of the tail to the coccyx. An equally strong signal with a very clear border in the skin (arrows) as well as muscles and liver was observed in F3 group.

In FIG. 4 (acridine orange) there is a strong positive response in the form of green light emission in the dermis and subcutaneous layer, the strongest in F1 and F3 groups (arrow). In F3 group, a positive response occurs only on the surface of the epidermis. 40× magnification.

In FIG. 5 (muscle tissue), a positive response was observed similarly to that in the skin, wherein the contrast of the image had to be modified to show the signal at low magnification. The negative reaction was observed in F2 group (strong contrast-enhancement of the image). 100×, 100× and 400× magnification.

Figure 6:
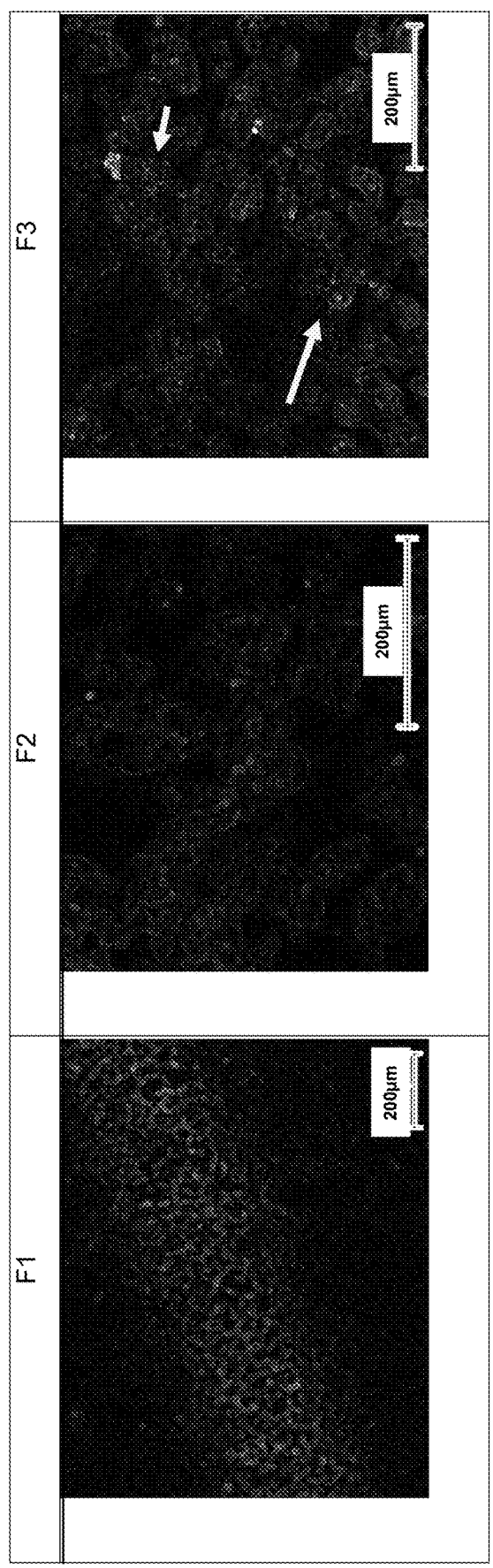

In FIG. 6 showing the liver sample, a positive response is visible in F3 group (arrow). Negative results were observed in other groups. 400× magnification.

The use of this fluorochrome, as well as another, rhodamine, can be applied to study the penetration of a substance into the body through the skin, provided that the passage and accumulation of dye in the cells is documented. This fluorochrome is much better exposed in areas with high cell density (epithelium, muscle tissue, hepatocytes), and less so in the connective tissue of the skin or subcutaneous.

Figure 7:
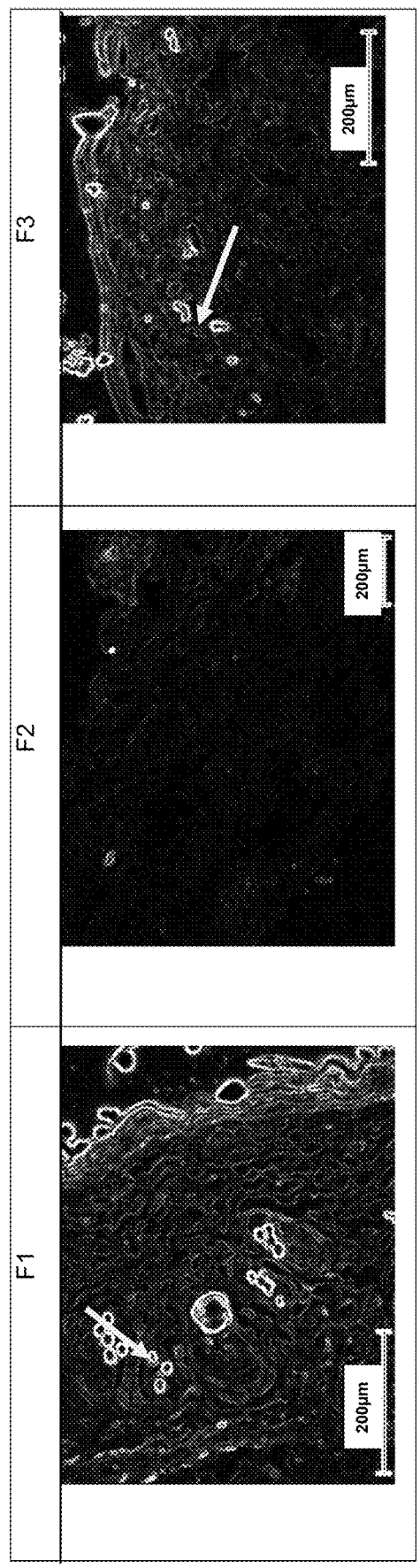

In FIG. 7, rhodamine very strongly stained glandular cells and other connective tissue cells in the dermis. The strongest positive response was observed in F1 and F3 groups. 100×, 100× and 40× magnification.

In FIG. 8, showing liver sample, weak positive response in F1 and F3 groups is visible. 100× magnification.

Rodamine has shown a very high ability to stain skin elements such as epithelial gland cells (both sebaceous and sweat), dermis cells (fibroblasts, macrophages and lymphocytes) and after crossing the blood barrier it has partially accumulated in the liver.

EXAMPLE 32. METHOD OF PREPARATION OF MEDICINAL PRODUCT CONTAINING SUBSTANCES FROM THE GROUP OF PROTEINS

Substance from the group of antibodies was used as the reference substance:

The antibody directed against the CD3 antigen—a molecule present on T lymphocytes, is a protein complex that is part of the T lymphocyte receptors (TCR), is made of five chains: δ, γ, ε, ζ and η. The CD3 chains mediate signal transduction from the T lymphocyte receptor, which has bound the antigen, into the cell. CD3 is the equivalent of the Igα and Igβ molecules in B lymphocytes.

Each of the CD3 chains is encoded by a separate gene:
1. the CD3γ chain is encoded by the CD3G gene, located on chromosome 11q23 in man,
2. the CD3δ chain is encoded by the CD3D gene, also located on chromosome 11q23,
3. the CD3ζ chain is encoded by the CD247 (formerly CD3Z) gene located on chromosome 1q22-q25.

As a result of alternative splicing, the CD3ζ chain can be produced in a form containing fewer lymphocyte activating motifs and is then referred to as CD3η. This form of protein is mainly produced in thymocytes and partly replaces CD3ζ in TCR complexes. mRNA for CD3η is also detected in mature T cells, but its content is much smaller (10 times or more) than mRNA for CD3η, therefore it is believed that CD3η performs its functions mainly during the development of T lymphocytes.

During the development of T lymphocytes in the thymus, CD3 protein expression can be found at the stage of pro-thymocyte, but only in the cytoplasm of the cell. A similar situation occurs at the pre-thymocyte stage, however, when the expression of TCRα and TCRβ chains begins, CD3 molecules also appear in the cell membrane. Membrane (surface) expression of CD3 is characteristic of each further developmental stage of T lymphocytes and persists until the end of the life of the cell.

In addition to T cells, weak CD3 expression, located only in the cytoplasm, was found in Purkinje cells.

The CD3γ, CD3δ and CD3ε peptide chains belong to the same immunoglobulin superfamily and show strong similarity in amino acid sequence and structure. They all have an extracellular immunoglobulin-like domain, followed by a helical fragment passing through the cell membrane and a cytoplasmic tail containing activating ITAM sequences. Each of the γ, δ, and ε chains contains two ITAM motifs. In turn, the CD3ζ chain does not have an extracellular immunoglobulin domain, but instead contains four ITAM motifs in the cytoplasmic part. The CD3η variant has three ITAM motifs. The transmembrane region of each CD3 molecule is negatively charged, which results in the formation of a complex with positively charged TCR chains. In this way, TCRα-CD3γ-CD3ε-CD3ζ-CD3ζ and TCRβ-CD3δ-CD3ε complexes are formed, which together form the complete TCR complex.

T lymphocytes are cells that are largely responsible for the development of inflammation. For this reason, agents whose action is assumed to inhibit CD3 (and therefore T-lymphocyte) activation are tested for anti-inflammatory properties in autoimmune diseases and type 1 diabetes.

Monoclonal antibodies directed against CD3 and conjugated with fluorescent dyes or enzymes allow the determination of the frequency or number of these cells in blood and tissues using cytometric and immunohistochemical methods.

In diagnostics, CD3 determination is particularly useful for leukemia.

The composition ratio of the F1 carrier described in Example 1 was used in the experiment. An active substance in an amount of 100 mg (at a concentration of 50 μg/g anti-CD3 antibody suspension) was added to the composition of the carrier in an amount of 20 g obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate described in Example 4 (80 g) while stirring (500 RPM) for 8 minutes.

As a result, a preparation of homogeneous consistency and color was obtained with uniformly levigated substances, where the ratio between the carrier and the substrate was 1:5.

EXAMPLE 33. METHOD OF PREPARATION OF MEDICINAL PRODUCT CONTAINING SUBSTANCES FROM THE GROUP OF PROTEINS

Substance from the group of antibodies was used as the reference substance:
Antibody Directed Against CD3 Antigen The composition ratio of the F1 carrier described in Example 1 was used in the experiment. An active substance in an amount of 100 mg (at a concentration of 50 μg/g anti-CD3 antibody suspension) was added to the composition of the carrier in an amount of 1 g obtained according to procedure described for F1 and molten at 40 degrees Celsius.

After mixing (200 RPM) for about 10 minutes, a homogeneous mixture was obtained and the substances used dissolved completely after mixing. The mixture thus obtained was added to the substrate described in Example 4 (98.8 g) while stirring (500 RPM) for 8 minutes.

As a result, a preparation of homogeneous consistency and color was obtained with uniformly levigated substances, where the ratio between the carrier and the substrate was 1:99.

EXAMPLE 34. METHOD OF PREPARATION OF MEDICINAL PRODUCT CONTAINING SUBSTANCES FROM THE GROUP OF PROTEINS

Substance from the group of antibodies was used as the reference substance:
Antibody Directed Against CD3 Antigen The composition ratio of the F1 carrier described in Example 1 was used in the experiment. A part of a substrate described in Example 4 in an amount of 20 g was added to the composition of the carrier in an amount of 20 g, obtained according to procedure described for F1 and molten at 40 degrees Celsius, followed by active substance in an amount of 100 mg (at a concentration of 25 μg/g anti-CD3 antibody suspension).

After mixing (400 RPM) for about 10 minutes, a homogeneous mixture was obtained and the substances used dissolved completely after mixing. The mixture thus obtained was added to the remaining substrate described in Example 4 (20 g) while stirring (500 RPM) for 8 minutes.

As a result, a preparation of homogeneous consistency and color was obtained with uniformly elevated substances, where the ratio between the carrier and the substrate was 1:2, and an amount of carrier constituted 20% of the total weight of the final product.

EXAMPLE 35. METHOD OF PREPARATION OF MEDICINAL PRODUCT CONTAINING SUBSTANCES FROM THE GROUP OF PROTEINS

Substance from the group of antibodies was used as the reference substance:
Antibody Directed Against CD3 Antigen The composition ratio of the F1 carrier described in Example 1 was used in the experiment. A part of a substrate described in Example 4 in an amount of 1 g was added to the composition of the carrier in an amount of 1 g, obtained according to procedure described for F1 and molten at 40 degrees Celsius, followed by active substance in an amount of 100 mg (at a concentration of 25 µg/g anti-CD3 antibody suspension).

After mixing (400 RPM) for about 10 minutes, a homogeneous mixture was obtained and the substances used dissolved completely after mixing. The mixture thus obtained was added to the remaining substrate described in Example 4 (96 g) while stirring (500 RPM) for 8 minutes.

As a result, a preparation of homogeneous consistency and color was obtained with uniformly elevated substances, where the ratio between the carrier and the substrate was 1:97, and an amount of carrier constituted 1% of the total weight of the final product.

An experiment was carried out to confirm the functionality of the described solution.

The aim of the test was to assess the skin's penetration ability of the anti-mouse CD3ε antigen labeled with the Alexa Fluor 647 fluorescent dye encapsulated in a micellar carrier. Due to the specificity of the antibody encapsulated in the carrier, the test was performed on a mouse model.

10 mg carrier with antibody and base (carrier without antibody) were applied to the mouse ears and mounted on a slide using silicone ointment on the inside of the left and right ear, respectively. Even distribution of the carrier over the ear was achieved after mounting the coverslip. The described approach was used for preparations A (F2+CD3), B (F1+CD3), C (amphiphilic substrate+CD3), D (lipophilic substrate+CD3) and control bases A0 (F2), B0 (f1), C0 (amphiphilic substrate) and D0 (lipophilic substrate). The preparations thus prepared were incubated at 37° C. for 4 hours. After this time, coverslips were removed, test carriers were removed, and new coverslips were mounted and images were recorded. For the initial comparison of the preparations, imaging was performed with a Leica SP8 MP confocal microscope using a 25× magnification water lens. Fluorescence emission in the 646-750 nm range was collected for the AF647 dye excited with 638 nm laser (to visualize the antibody), 638 nm laser light reflection in the range 624-653 nm (to visualize skin layers) and the range of 440-459 nm for the second harmonic after excitation with an infrared laser with a wavelength of 900 nm (to visualize collagen in the dermis). The samples were scanned in the Z axis about 100 µm deep covering the entire thickness of epidermis and dermis. Three randomly selected fields of view were imaged for each preparation.

FIG. 9 shows normalized values, where the mean fluorescence intensity of the test tissue is a percentage of the control tissue fluorescence intensity (100%) treated with the carrier without antibody.

After the initial comparison of all carriers and their controls, preparation B (F1+CD3) was selected for subsequent analyzes due to the largest difference in fluorescence intensity of the tissue treated with this carrier compared to the tissue treated with the base mixture (p=0.1). For the remaining carriers, there was no difference in the fluorescence intensity of the examined tissue compared to the control tissue, which may indicate that the carrier did not pass the epidermal layer and did not penetrate deep into the dermis of the analyzed ear.

After initial evaluation, preparation B (F1+CD3) was tested on more tissues (n=3).

Data are presented in the form of charts. FIG. 10 shows the absolute values of the mean fluorescence intensity for carrier B (F1+CD3) and the B0 (F1) basal mixture, while FIG. 11 shows the normalized values, where the mean value of the fluorescence intensity of the tissue treated with carrier B (F1+CD3) is the % of fluorescence intensity of the tissue treated with the basal mixture (100%).

For initial comparisons of average values determined for four series of results: A, B, C and D, a nonparametric Kruskal-Wallis analysis of variance (ANOVA) was used together with the Median test and Dunn's test for nonparametric post-hoc peer-to-peer comparisons (Table 4 and FIG. 12).

TABLE 4

'z' value for multiple comparisons; W independent variable (grouping): S
Kruskal-Wallis test: H (7, N = 24) = 14.69333 p = .0401

| Dependant variable: W | Prep_A_ base | Prep_A_ AF647 | Prep_B_ base | Prep_B_ AF647 | Prep_C_ base | Prep_C_ AF647 | Prep_D_ base | Prep_D_ AF647 |
| --- | --- | --- | --- | --- | --- | --- | --- | --- |
| Prep_A_base |  | 0.519615 | 2.251666 | 0.288675 | 2.251666 | 2.367136 | 0.404145 | 0.461880 |
| Prep_A_AF647 | 0.519615 |  | 1.732051 | 0.230940 | 1.732051 | 1.847521 | 0.115470 | 0.057735 |
| Prep_B_base | 2.251666 | 1.732051 |  | 1.962991 | 0.000000 | 0.115470 | 1.847521 | 1.789786 |
| Prep_B_AF647 | 0.288675 | 0.230940 | 1.962991 |  | 1.962991 | 2.078461 | 0.115470 | 0.173205 |
| Prep_C_base | 2.251666 | 1.732051 | 0.000000 | 1.962991 |  | 0.115470 | 1.847521 | 1.789786 |
| Prep_C_AF647 | 2.367136 | 1.847521 | 0.115470 | 2.078461 | 0.115470 |  | 1.962991 | 1.905256 |
| Prep_D_base | 0.404145 | 0.115470 | 1.847521 | 0.115470 | 1.847521 | 1.962991 |  | 0.057735 |
| Prep_D_AF647 | 0.461880 | 0.057735 | 1.789786 | 0.173205 | 1.789786 | 1.905256 | 0.057735 |  |

Based on the results obtained, data obtained for series B were subjected to further statistical analysis. The average values of the variables Prep_B_base and Prep_B_AF647 calculated from 13 replicates were compared by the parametric Student's t-test. The normality of distributions for the analyzed variables was assessed by the Kolmogorov-Smirnov, Lilliefors and W Shapiro-Wilk tests. Levene and Brown—Forsyth tests were used to assess the homogeneity of their variance. In all statistical analyzes and tests used, the significance level was α=0.05 or its value modified by Bonferroni correction in the case of multiple comparisons.

Test results are illustrated in FIGS. 13 and 14.

| | | | Tests t; Grouping: Serie+3 Group 1: Prep_B_base+3 Group 2 Prep_B_AF647+3 | | | | | | | |
|---|---|---|---|---|---|---|---|---|---|---|
| Variable | Mean Prep_B_ base+3 | Mean Prep_B_ AF647+3 | t | df | p | t (Cochran-Cox test) | df | p (two-sided) | N imp. Prep_B_ base+3 | N imp. Prep_B_ AF647+3 |
| W_Sur+3 | 34.04868 | 48.0736 | −2.7402 | 24 | 0.01140 | −2.7402 | 21.7758 | 0.012015 | 13 | 13 |
| W_Std+3 | 100.00000 | 141.1909 | −2.7402 | 24 | 0.01140 | −2.7402 | 21.7758 | 0.012015 | 13 | 13 |
| W_Norm+3 | 3.45616 | 3.8305 | −2.6065 | 24 | 0.01547 | −2.6065 | 22.1850 | 0.016045 | 13 | 13 |
| Variable | Std Dev Prep_B_ base+3 | Std Dev Prep_B_ AF647+3 | Variance quotient F | Variance p | Levene's F(1,df) | Levene's df | Levene, sp | Brn-Fors f(1,df) | df Brn-Fors | p Brn-Fors |
| W_Sur+3 | 10.7652 | 14.98953 | 1.939399 | 0.265349 | 0.43597 | 24 | 0.51535 | 0.47716 | 24 | 0.49633 |
| W_Std+3 | 31.61215 | 44.02381 | 1.939399 | 0.265349 | 0.43597 | 24 | 0.51535 | 0.47716 | 24 | 0.49633 |
| W_Norm+3 | 0.40524 | 0.30194 | 1.801203 | 0.321524 | 0.41793 | 24 | 0.52410 | 0.19831 | 24 | 0.66007 |

CONCLUSIONS

After using preparation B containing the antibody directed against murine CD3ε antigen labeled with the Alexa Fluor 647 fluorescent dye, the fluorescence intensity increases by about 40% compared to no-antibody control.

For the remaining preparations, no differences were observed between tissues treated with carriers with antibody and control carriers.

The invention claimed is:

1. A pharmaceutical homogeneous carrier for both water-soluble active substances and fat-soluble active substances, characterized in that it contains:
   a) a sulfoxide in an amount of 0.01% to 5% by weight,
   b) a carbonic acid amide in an amount of 0.01% to 2% by weight, and
   c) a vegetable oil selected from the group consisting of Chaulmoogra oil, linseed oil, rapeseed oil, peanut oil, sunflower oil, and hemp oil in an amount of 1% to 5% by weight;
   wherein vitamin C dissolves in the carrier at 40° C. and vitamin A dissolves in the carrier at room temperature.

2. The carrier according to claim 1, characterized in that the solvating aprotic solvent from the group of sulfoxides is dimethyl sulfoxide.

3. The carrier according to claim 1, characterized in that the carbonic acid amide is selected from the group consisting of urea, caffeine and caffeine-containing absorption promoters.

4. The carrier according to claim 1, characterized in that it additionally contains a natural emulsifier, selected from the group consisting of white wax, yellow wax, Carnauba wax, and lanolin.

5. The carrier according to claim 1, characterized in that it further contains a natural emulsifying substance in an amount of 0.001% to 8% by weight.

6. A semi-solid pharmaceutical composition characterized in that it contains a carrier as defined in claim 1, excipients, and at least one active substance, wherein the weight ratio of active substances to the carrier is from 1:10 to 2:1 and the carrier constitutes from 1% to 20% by weight of the composition.

7. The composition according to claim 6, characterized in that the weight ratio of the active substances to excipients is from 1:2.5 to 1:494, and it has a semi-solid drug form.

8. The composition according to claim 6, characterized in that it contains active substances selected from the group consisting of *Coptis* Chinesis, *Curcuma longa* extracts and combinations thereof.

9. The composition according to claim 6, characterized in that the excipients are selected from the group consisting of pork lard, duck lard, goose lard, white petrolatum, yellow petrolatum, zinc sulfate, and combinations thereof.

10. The carrier according to claim 1, characterized in that the solvating aprotic solvent from the group of sulfoxides is dimethyl sulfoxide and the carbonic acid amide is urea.

* * * * *